(12) United States Patent
Esliger (10) Patent No.: US 7,716,500 B2
(45) Date of Patent: May 11, 2010

(54) POWER SOURCE DEPENDENT PROGRAM EXECUTION

(75) Inventor: James L. Esliger, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 724 days.

(21) Appl. No.: 11/469,208

(22) Filed: Aug. 31, 2006

(65) Prior Publication Data

US 2008/0059814 A1    Mar. 6, 2008

(51) Int. Cl.
*G06F 1/26* (2006.01)
(52) U.S. Cl. .................. 713/300; 713/320; 713/340
(58) Field of Classification Search .............. 713/300, 713/320, 340
See application file for complete search history.

(56) References Cited

U.S. PATENT DOCUMENTS

| | | | |
|---|---|---|---|
| 6,215,275 | B1 | 4/2001 | Bean |
| 6,291,976 | B1 | 9/2001 | Kaminski et al. |
| 6,624,816 | B1 | 9/2003 | Jones, Jr. |
| 7,251,737 | B2 * | 7/2007 | Weinberger et al. ......... 713/320 |
| 2003/0042871 | A1 | 3/2003 | Schlicht |
| 2004/0215987 | A1 | 10/2004 | Farkas et al. |
| 2005/0125172 | A1 | 6/2005 | Patino et al. |
| 2005/0266301 | A1 | 12/2005 | Smith et al. |
| 2006/0051659 | A1 | 3/2006 | Kelly et al. |
| 2008/0059921 | A1 | 3/2008 | Esliger et al. |

OTHER PUBLICATIONS

C.F. Chiasserini et al., "Pulsed Battery Discharge in Communication Devices", Proceedings of the 5th Annual ACM/IEEE International Conference on Mobile Computing and Networking, 1999, pp. 88-95. Seattle, Washington, United States.
C.F. Chiasserini et al., "Improving Battery Performance by Using Traffic Shaping Techniques", IEEE Journal on Selected Areas in Communications Wireless Series, 2001, pp. 1385-1394, vol. 19, No. 7.
Sung Park et al., "Battery Capacity Measurement and Analysis Using Lithium Coin Cell Battery", Networked and Embedded Systems Laboratory, University of California, Los Angeles, United States.
J. R. Lorch, "A Complete Picture of the Energy Consumption of a Portable Computer", Master's Thesis, 1995, University of California at Berkeley, United States.
C.F. Chiasserini et al., "Energy Efficient Battery Management", IEEE Journal on Selected Areas in Communication: Wireless Series, 2001, pp. 1235-1245, vol. 19, No. 7.
C. F. Chiasserini et al., "A Model for Battery Pulsed Discharge with Recovery Effect", IEEE Wireless Communications and Networking Conference, 1999, New Orlans, United States.

(Continued)

*Primary Examiner*—Chun Cao
(74) *Attorney, Agent, or Firm*—Vedder Price, P.C.

(57) ABSTRACT

An electronic device having a processor powered by a power source may be operated by providing a plurality of program portions individually executable by the processor for performing the same computing function. Each program portion causes the processor to exhibit a different instantaneous power consumption profile while performing the computing function. A particular program portion is selected based on at least one characteristic of the power source and executed on the processor to perform the computing function.

26 Claims, 2 Drawing Sheets

OTHER PUBLICATIONS

C. F. Chiasserini et al., "A Traffic Control Scheme to Optimize the Battery Pulsed Discharge", The IEEE Military Communications Conference, 1999, Atlantic City, United States.

J. Flinn et al., "Energy-Aware Adaptation for Mobile Applications", Proceedings of the 17th ACM Symposium on Operating Systems Principles (SOSP), 1999, pp. 48-63, ACM Press, Charleston, South Carolina, United States.

M. Adamou et al., "A Framework for Optimal Battery Management for Wireless Nodes", IEEE Journal on Selected Areas in Communications, 2001, pp. 179-188, vol. 21, Issue 2.

M. Adamou et al., "Computationally Simple Battery Management Techniques for Wireless Nodes", Proceedings of European Wireless, 2002, pp. 218-223, Florence, Italy.

J. R. Lorch et al., "Software Strategies for Portable Computer Energy Management", IEEE Personal Communications, 1998, pp. 60-73.

M. Othman et al., "Power Conservation Strategy for Mobile Computers Using Load Sharing", Department of Computer Science, University College London, London, United Kingdom.

J. Suh et al., "Dynamic Power Management of Multiprocessor Systems", University of Souther California/Information Sciences Institute, Arlington, United States.

J. R. Lorch et al., "Using User Interface Event Information in Dynamic Voltage Scaling Algorithms".

J. R. Lorch et al., "Scheduling Techniques for Reducing Processor Energy Use in MacOS", Computer Science Division, EECS Department, UC Berkeley, Berkeley, United States.

M. Anand et al., "Ghosts in the Machine: Interfaces for Better Power Management", Department of Electrical Engineering and Computer Science, University of Michigan, United States.

H. Zeng et al., "ECOSystem: Managing Energy as a First Class Operating System Resource", Technical Report CS-2001-01, 2001, Department of Computer Science, Duke University.

M. Weiser et al., "Scheduling for Reduced CPU Energy", Proceedings of the First Symposium on Operating Systems Design and Implementation, Usenix Association, 1994.

* cited by examiner

POWER SOURCE DEPENDENT PROGRAM EXECUTION

RELATED APPLICATION

A related application, entitled "Method and Apparatus for Optimizing Power Consumption in a Multiprocessor Environment", naming the inventor hereof, and commonly owned by the same assignee, is filed on the same date as this application. The contents of this application are hereby incorporated herein by reference.

FIELD OF THE INVENTION

The present invention relates to electronic devices and methods, particularly those that involve selective execution of computer instructions on a processor, in dependence on the power source of the device.

BACKGROUND OF THE INVENTION

Many electronic devices, such as portable devices and handheld devices in the form of portable computers, personal digital assistants, media players, mobile telephones, and the like, are powered by portable power sources, such as batteries, with limited storage capacities. Typically such power sources need to be recharged or replaced when stored energy falls below a certain level.

Known techniques for prolonging battery life in such devices focus on minimizing power consumption or power conservation, such as selectively switching between a high consumption mode and a low consumption mode. In the low consumption mode, power consumption is reduced by reducing the device's functionality or performance level. For instance, various clock frequencies may be reduced; the operation of certain components, applications, or functional blocks within a component may be shut down, temporarily suspended, or run in a low power state with reduced functionality; operating voltages may be throttled; or any combination of these steps may be taken. Further, conventional techniques focus on management of the operation of hardware components. For example, a hardware component may be selectively activated or deactivated depending on the current power consumption-supply status or a selected power consumption strategy.

Of course, as less power is consumed, the battery discharges at a lower rate. Since the battery lifetime is dependent on its discharge, when the discharge rate is lowered, the lifetime can be prolonged.

However, such conventional power conservation techniques often sacrifice performance to gain longer battery lifetime. Another problem with the conventional techniques, including the power conservation techniques, is that the power sources are not efficiently or optimally utilized in many situations.

Accordingly, there is a need for methods and devices that can more efficiently utilize power sources such as batteries in electronic devices.

SUMMARY OF THE INVENTION

According to an aspect of the present invention, there is provided a method of operating an electronic device having a processor powered by a power source. A plurality of program portions individually executable by the processor for performing the same computing function are provided. Each one of the program portions causes the processor to exhibit a different instantaneous power consumption profile while performing the computing function. A particular one of the program portions is selected from the program portions based on at least one characteristic of the power source and executed on the processor to perform the computing function. The program portions may comprise at least one of a program portion that causes the processor to exhibit a constant current draw pattern, and a program portion that causes the processor to exhibit a pulsed current draw pattern. The program portion may be selected based on the characteristics of the processor and the characteristics of the power source. The power source may comprise a battery or a fuel cell. The particular program portion may be selected to maximize the battery's discharge time, or to match the battery's discharge capacity such as instantaneous discharge capacity. The particular program portion selected may cause the processor to exhibit a pulsed or constant current draw pattern so as to utilize the battery's self-recharging capability. The selection may be performed in response to a request to perform the computing function or during the power-up of the electronic device. Each program portion may be associated with a respective type of power source, and the selection may include determining that the power source is of a particular type and that the particular program portion is associated with the particular type. The program portions may be each associated with a different type of power source selected from nickel-iron batteries, nickel-cadmium batteries, alkaline batteries, nickel-metal-hydride batteries, lead-acid batteries, lithium-ion batteries, zinc-carbon batteries, zinc-chloride batteries, silver-oxide batteries, lithium batteries, mercury batteries, zinc-air batteries, lithium-ion polymer batteries, sodium-sulphur fuel cells, and solar batteries. The program portions may be each associated with a different type of batteries selected from disposable batteries and rechargeable batteries. The characteristics of the power source may be provided by the power source.

In accordance with another aspect of the invention, there is provided a computing device comprising a processor, a power source for powering the processor, and a computer readable memory storing processor executable code. The code when executed by the processor causes the processor to perform the method described above.

In accordance with another aspect of the present invention, a method of configuring an electronic device, comprising a processor and a source of stored electrical energy, comprises: determining a power provision profile for said source when providing electrical power to said device; coding a program portion based on said power provision profile in order to increase the useful life of said power storage source, using said program portion; storing said program portion on said device for later execution.

In accordance with another embodiment of the present invention, there is provided a computer readable storage medium storing program portions used to form an electronic device having an energy storage source. The program portions comprise code coded based on a power provision profile of the energy source, and coded to increase the useful life of said energy storage source when the electronic device executes said program portions.

In accordance with a further aspect of the invention, there is provided a computer readable medium storing computer readable code, the code, when executed by a processor powered by a power source, causes the processor to perform the method described above.

Other aspects and features of the present invention will become apparent to those of ordinary skill in the art upon review of the following description of specific embodiments of the invention in conjunction with the accompanying figures and tables.

BRIEF DESCRIPTION OF THE DRAWINGS

In the figures, which illustrate, by way of example only, embodiments of the present invention.

DETAILED DESCRIPTION

Figure 1:
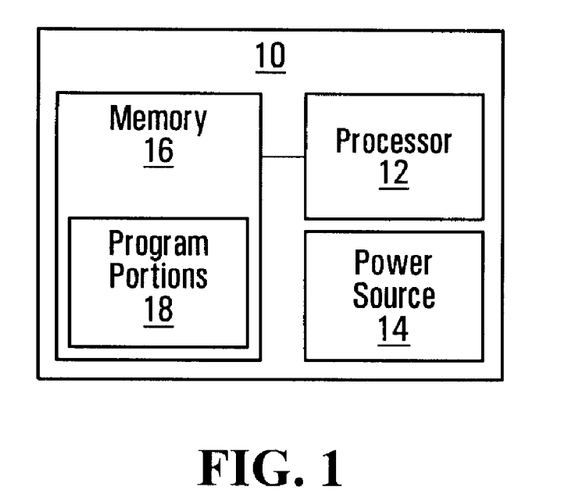
FIG. 1 is a schematic block diagram of a computing device.

FIG. 1 illustrates an electronic device 10, exemplary of an embodiment of the present invention. Device 10 can, for example, be a computing device or device that has a computing unit. Device 10 may, for example, be a portable or handheld device, but may also be a normally stationary device, such as a desktop device or a device mounted to a frame/support. For example, device 10 may be a portable or handheld computer, telephone, game device, an electronic audio or video recorder/player, an electronic camera, a measuring device, a computerized tool, or the like.

Device 10 includes a processor 12, powered by and operationally coupled to a power source 14. Processor 12 is in communication with memory 16. Device 10 may include any other additional components (not shown) that may be necessary or optional for its operation.

Processor 12 can be any suitable processor for computing including microprocessors, as can be understood by persons skilled in the art. Processor 12 may include one or more processors for processing data and computer executable codes or instructions. Conventional processors, such as an Intel based x86, AMD, or RISC processor, may be used.

Power source 14 may be any suitable power source. For example, power source 14 may include a source of stored electrical energy, such as a battery, a fuel cell, or the like. Power source 14 may also include more than one power unit, from which a particular unit may be selected for powering processor 12 by a user during use. Power source 14 may provide power to processor 12 and other components of the device 10. Power source 14 may be the only power source, or one of a plurality of power sources, for providing power to device 10. Power source 14 may be housed inside or externally attached to device 10. Power source 14 may be removably attached. Of interest, power source 10 has power provision characteristics that may be assessed under varying loads as a function of time, as detailed below.

Device 10 may be powered by different types of power sources, such as different batteries, fuel cells, or the like. For example, a suitable power source for a handheld or portable computer can be a battery. An example battery may be selected from disposable batteries and rechargeable batteries, having varying chemical compositions, including nickel-iron batteries, nickel-cadmium batteries, alkaline batteries, nickel-metal-hydride batteries, lead-acid batteries, lithium-ion batteries, zinc-carbon batteries, zinc-chloride batteries, silver-oxide batteries, lithium batteries, mercury batteries, zinc-air batteries, lithium-ion polymer batteries, sodium-sulphur batteries, fuel cells, solar batteries. A battery may include a power conditioning circuit (not shown) that controls the operation of the battery. The circuit may include a voltage regulator (not shown) and other components (not shown) for coupling the battery to an energy consuming device such as a computer. For instance, the voltage regulator may provide a constant output voltage to the device, even though the charge storage level and output voltage from the battery may fluctuate or decrease over time as the battery discharges and recharges. Device 10 may include two or more power sources. For example, power source 14 may include more than one battery.

Memory 16 may include a primary memory readily accessible by processor 12 at runtime. The primary memory may include a random access memory (RAM) and may only need to store data including compute executable instructions at runtime. Memory 16 may also include a secondary memory, which may be a persistent storage memory for storing data and instructions permanently, typically in the form of electronic files. The secondary memory may also be used for other purposes known to persons skilled in the art. Memory 16 can include one or more computer readable media. For example, memory 16 may be an electronic storage comprising a computer readable medium for storing electronic data including computer executable code. The computer readable medium can be any suitable medium accessible by a computer, as can be understood by a person skilled in the art. A computer readable medium may be either removable or non-removable, either volatile or non-volatile, including any magnetic storage, optical storage, or solid state storage devices, or any other medium which can embody the desired data including computer executable instructions and can be accessed, either locally or remotely, by a computer or computing device. Any combination of the above is also included in the scope of computer readable medium. Memory 16 may store computer executable instructions for operating device 10 in the form of program code, as will be further described below. Memory 16 may also store data such as operational data, input data, and output data.

Device 10 may also be in communication with any number of input and output components. The input components may include a component for receiving user input such as user command or for receiving data. Example user input components may include a keyboard, a mouse, a touch pad, a disk drive/disk, a network communication device, a microphone, a scanner, a camera, and the like. Output components may include one or more of audio and visual output components, such as a display in the form of a monitor or panel for displaying output data to a user, a printer for printing output data, a communication interface for communicating output data to another computer or device, and the like, as can be understood by persons skilled in the art. Output components may also include other components such as a computer writable medium and the hardware for writing to the medium. An input or output component can be locally or remotely connected to processor 12.

Memory 16 may store computer executable code or instructions, which when executed by processor 12 can cause device 10 to perform certain computing tasks or functions. Typically, memory 16 adapts device 10 to perform user desired functions. For example, computer executable code may include an operating system, end-user applications, micro-code, hardware drivers, or the like. The computer executable code or instructions include a plurality of program portions 18, which are functionally equivalent, and are individually executable by processor 12 for performing the same computing function. That is, to a user, there is no noticeable or material difference in the functionality, performance or output between the program portions 18.

The term "program portion" as used herein, is intended to refer to any form of computer executable code that is suitable for execution by processor 12 to perform the particular computing task. For example, a program portion may include a function, a routine, an object, a program, or the like. A program portion 18 may be executed directly by processor 12, or through an intermediate piece of software executing at device 10, such as a run time interpreter, compiler, or the like. Each program portion 18 may thus be stored as machine executable code, source code, byte code, or the like. It may similarly be formed as firmware for use by processor 12.

Each program portion 18 may be a standalone program, or a component, such as routine, a subprogram in a program suite, or an object class or instance (or procedure thereof) in an object oriented computing environment. The function can be any function and may broadly include specific functions such as performing a particular calculation or general functions such as video decoding or processing. The function may or may not require user input. To perform the function, extensive power consumption may be required. However, the extent of power consumption may vary and may be less extensive in some applications. Alternatively, memory 16 may store only a particular one program portion 18, which is selected from a plurality of program portions 18 as further described below.

Each program portion 18 may be coded such that it causes processor 12 to exhibit distinct power consumption characteristics, such as current draw patterns, when executed by processor 12 to perform the particular function. The power consumption may be characterized by an instantaneous power consumption profile, such as a current draw profile. The instantaneous power consumption profile may be thought of as a relationship of instantaneous power consumption over time, for the time required to execute program portion 18.

Figure 4A:
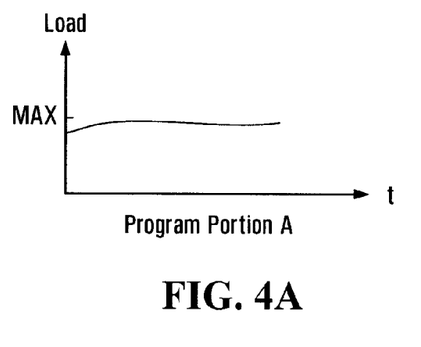
FIGS. 4A and 4B are line graphs showing instantaneous power consumption profile for three functionally equivalent program portions.
Figure 4B:
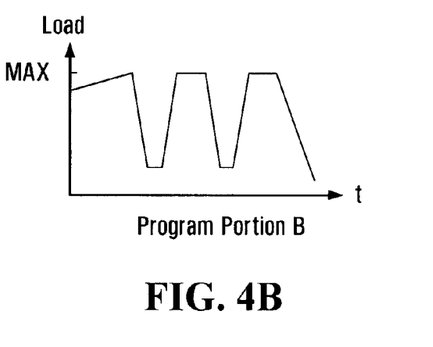

For example, a program portion 18 may be coded to cause processor 12 to consume a relatively constant amount of instantaneous power over an execution interval. As a consequence, electronic charges may be drawn from battery 14 at a relatively constant rate over the interval. Alternatively, a program portion 18 may be coded to consume maximum electrical power for a short interval thereby completing an associated function, and thereafter little or no power. Similarly, a program portion 18 may repeatedly cause processor 12 to consume electrical power, substantially cease consuming power, and resume consuming electrical power, to consume power. Example instantaneous power consumption profiles corresponding to differing program portions 18 are illustrated in FIGS. 4A and 4B. Conveniently, each program portion 18, although having a different power consumption profile, performs the same function. Possibly, (but not necessarily), the total amount of energy consumed in the execution of each different program portion 18 may be the same, while the instantaneous power consumption profile differs from other program portions 18, having the same function.

Conveniently, differing program portions 18 that are functionally equivalent, may be coded to have power consumption characteristics based on the power output characteristics of a particular type of power sources. In this way, the power consumption characteristics exhibited by the processor executing the program portion and the output characteristics of the particular type of power sources may be better or optimally matched.

Power consumption characteristics of a program portion 18 may be varied through choice of instructions, order of operation, pauses and the like. For example, a program portion may be coded to intermittently consume power by including a instructions pausing operation of processor 12, for defined periods of time between executing other instructions. Alternatively, differing processor instructions may be used to perform identical calculations, but result in different power consumption profiles. For example, a series of simple processor instructions may be used in place of more complex ones. Other ways of organizing program portions 18 to produce differing power consumption profiles will be apparent to those of ordinary skill.

It should be understood that different program portions 18 may thus be provided by different sets of computer executable instructions, i.e., different program codes, or by a single set of instructions and configuration parameters for the set of instructions where the set of instructions operates differently depending on values of the configuration parameters. The configuration parameters may thus define a state or mode setting that causes a program portion 18 to alter its operation. For example, a program portion may be table-driven where different algorithms or logic are followed depending on the values in an input table. In one embodiment, a single set of program instructions may cause the processor to exhibit different power consumption characteristics or current draw patterns, depending on an input parameter that is indicative of power source characteristics, the power state, the selected current-draw pattern, or the like. In this case, both the set of instructions and the input parameter are parts of a program portion. When the runtime input changes, the set of instructions and the new input form a different program portion.

In alternative embodiments, the parameters may be used to otherwise influence the operating condition of device 10, when the associated program portion is being executed. For example, the parameters may adjust the processing capabilities of the device, by for example by modulating, or changing the operation of processor 12, including its clock speed, or voltage, to produce a desired power consumption profile.

For instance, some batteries exhibit better performance such as increased lifetime when the current draw pattern or profile is nearly or substantially constant at a certain level while other types of batteries exhibit better performance when the current draw is pulsed, such as alternating between a high level and a low level. For a given characteristic current drain pattern of the battery, a corresponding program code may be developed to exhibit a current draw pattern that better matches an optimal current drain pattern of the battery, according to any suitable programming and power management technique, including conventional techniques.

Exemplary battery current drain patterns and power management techniques are discussed in, e.g., C-F. Chiasserini and R. R. Rao, "Pulsed battery discharge in communication devices", *Proceedings of the 5th annual ACM/IEEE international conference on Mobile computing and networking*, August 1999, pp. 88-95, Seattle, Wash., United States; C-F. Chiasserini and R. R. Rao, "Energy Efficient Battery Management", *IEEE Journal on Selected Areas in Communication (JSAC): Wireless Series*, July 2001, Vol. 19, No. 7, pp. 1235-1245; Chiasserini and R. R. Rao, "A Traffic Control Scheme to Optimize the Battery Pulsed Discharge", *The IEEE Military Communications Conference* (MILCOM), November 1999, Atlantic City, United States; Chiasserini and R. R. Rao, "A Model for Battery Pulsed Discharge with Recovery Effect", *IEEE Wireless Communications and Networking Conference* (WCNC), September 1999, New Orleans, United States; Chiasserini and R. R. Rao, "Improving Battery Performance by Using Traffic Shaping Techniques", *IEEE JSAC Wireless Series*, July 2001, Vol. 19, No. 7, pp. 1385-1394; J. Flinn and M. Satyanarayanan, "Energy-Aware Adaptation for Mobile Applications", *Proceedings of* the 17th ACM Symposium on Operating Systems Principles (SOSP), December 1999, pp. 48-63, ACM Press, Charleston, S.C., United States; J. R. Lorch, "A complete picture of energy consumption of a portable computer", Master's thesis, 1995, University of California at Berkeley, United States; M. Adamou and S. Sarkar, "A Framework for Optimal Battery Management for Wireless Nodes", IEEE Journal on Selected Areas in Communications, February 2003, Vol. 21, Issue 2, pp. 179-188; and M. Adamou and S. Sarkar, "Computationally Simple Battery Management Techniques for Wireless Nodes", *Proceedings of European Wireless*, February 2002, pp. 218-223, Florence, Italy, the contents of each of which are incorporated herein by reference.

As described in some of the above cited references, a battery can exhibit different current drain patterns and the lifetime of the battery may depend on the actual drain pattern, which is in turn dependent on the power consumption profile exhibited by the power consuming device. For instance, a pulsed current drain pattern may prolong the lifetime of a battery that has electrochemical cells where the electrochemical reactions in the electrochemical cells deplete an active (charge-producing) material at the electrode-electrolyte interface, but new charge-producing material can arrive through diffusion.

When the current drain is continuously above a certain level (e.g., above what is known as the limiting current), diffusion may be insufficient to compensate for the depletion of the charge-producing material and the charge generating capacity, or the output potential, of the cells would decrease quickly, even though the active material is still plenty elsewhere in the cells. When the battery output potential drops to below a threshold level, commonly referred to as the cut-off level, the device powered by the battery may need to shutdown or switch to a low power state. At this point, the battery may need to be replaced or recharged. Thus, the lifetime of the battery is short.

On the other hand, when the current drain on the battery is kept below a certain level, diffusion may provide sufficient self-recharge that the battery charge level is maintained above the cut-off level for a longer time. In this case, the output potential may only drop to below the cut-off level when active materials in all regions of the cells has been exploited, thus increasing the lifetime of the battery.

However, always operating at a low level may not be desirable or optimal in many applications. It has been shown that, when the current drain is pulsed, i.e., the current drain alternates between a low level and a high level, the lifetime of the battery may be still be increased because diffusion during the low level intervals may provide sufficient self-recharging so that the output potential also drops to below the cut-off level after all active material in the cells has been exploited. See, e.g., the articles authored by C-F Chiasserini and R. R. Rao listed above.

For such a battery, it may be advantageous if the power consumption profile from the device powered results in the current drain of the battery being pulsed. As will be appreciated, in a pulsed pattern, the current will increase and decrease to a significant degree repeatedly. However, it is not necessary that the high and low levels of a cycle are the same for all cycles. It is also not necessary that the cycles have the same time intervals or strictly periodic. Different cycles may have different or the same profile. There may still be some current drain at the low level of a cycle. For instance, a low-level constant background current drain load may be superimposed on a cyclic current drain load.

Figure 2:
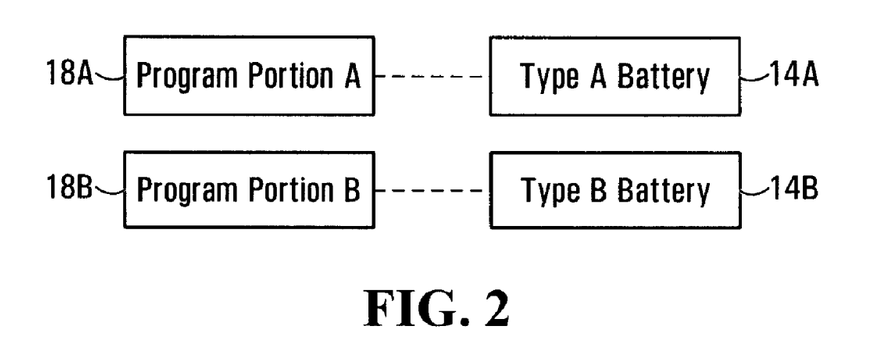
FIG. 2 is a block diagram illustrating two software blocks associated with two types of batteries.

FIG. 2 schematically illustrates two distinct program portions 18A and 18B, which are respectively designed to enhance utilization of two types of batteries, represented by a type A battery 14A and a type B battery 14B respectively. Program portions 18A and 18B are also collectively and individually referred to as program portion(s) 18 below.

As can be understood by persons skilled in the art, each type of battery may have distinct power discharge characteristics. The energy discharge of a battery 14A or 14B may depend on one or more of, among other things, the initial charge storage level, the intensity of the discharge current, the power level drained from the battery, and whether the discharge is constant or pulsed. The discharge profile of a battery is typically dependent on the load demand. The discharge profile or pattern of a battery may be expressed using its current drain profile or pattern, also referred to as current draw profile or pattern.

Although one current drain pattern may be efficient under one set of operating circumstances, a second current drain pattern may be better suited for another set of operating circumstances. One having ordinary skill in the art will recognize that operating circumstances include, but are not limited to, the load coupled to the battery, the type of battery employed, and the state of the battery.

Figure 3A:
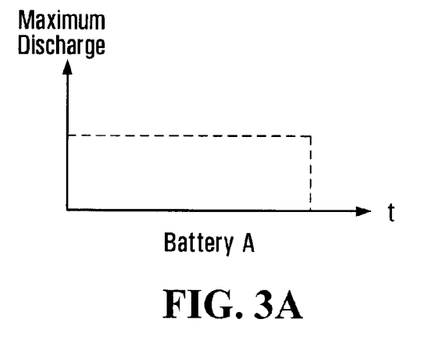
FIGS. 3A and 3B are respectively line graphs showing the discharge profiles of the two types of batteries.

For illustration purposes, it is assumed that an exemplary type A battery 18A has a maximum discharge rate, and a corresponding maximum instantaneous output capacity. Further, for simplicity, it is assumed that this maximum instantaneous output capacity does not depend on prior discharge history for the purpose of this illustration. An illustrative maximum discharge (output), or current drain, profile of type A battery 14A is shown in FIG. 3A.

Figure 3B:
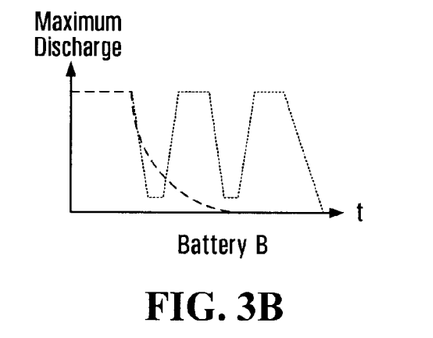

In contrast, it is assumed that an example type B battery 14B can operate at a higher maximum instantaneous output level for a certain period but if it is operated at or near this level over a long time the maximum instantaneous output capacity of battery B will drop off quickly, as shown by the dashed line in FIG. 3B. However, a type B battery 14B is assumed to be able to recover or restore quickly if the output level is maintained at a lower level as it can self-recharge. Example conventional batteries exhibit such discharge characteristics include batteries that have electrochemical cells such as lead-acid cells, and the like.

Conveniently, with intermittently reduced electrical load, battery 14B can exhibit an output profile as indicated by the dotted line in FIG. 3B. This type of discharge profile can occur, for example, when charges in the battery are distributed over a large volume and the region near the output contact can be temporarily depleted of charges due to rapid discharge. Over a relatively short period of time with low or no discharge, charges in other regions can move into the depleted region such that the maximum output level is restored. Thus, the type B batteries can have a relative long lifetime if the power load cycles between a high level and a low level such as shown in FIG. 3B. On the one hand, as indicated by the dashed line, if the power load is constantly at or near the maximum possible instantaneous output capacity at all times, the battery lifetime would be significantly shortened. On the other hand, as indicated by the dotted line, if the power load is intermittently reduced to substantially below the maximum instantaneous output capacity, the battery lifetime would be significantly prolonged.

For the purpose of illustration, it is assumed below that program portions 18A and 18B are respectively designed to take advantage of knowledge of these characteristics of batteries 14A and 14B, so that when executed on processor 12, they can cause processor 12 to exhibit the instantaneous power consumption profiles respectively shown in FIGS. 4A and 4B.

It should be noted that the exemplary profiles shown herein are for illustration purposes only and are not meant to reflect actual profiles. In practical applications, the actual consumption profiles and battery characteristics can be very different and may vary widely.

As illustrated in FIG. 4A, program portion 18A is designed so that the associated power consumption profile is relatively constant over time and the load level is near but below the maximum output level of type A battery indicated.

In comparison, program portion 18B is coded so that the associated power consumption profile fluctuates substantially, as illustrated by the line shown in FIG. 4B, where the maximum instantaneous output capacity of type B battery 14B is also indicated.

As can be appreciated, the instantaneous power consumption profiles shown in FIGS. 4A and 4B are designed based on the characteristics of the respective batteries 14A, 14B to efficiently utilize the respective batteries.

Now, both program portions 18A and 18B may be stored in memory 16 allowing enhanced use of either type of batteries 14A or 14B in device 10. Alternatively, one of program portions 18A and 18B may be stored on memory 16 depending on the type of battery that is to be used with device 10. Optionally, one of program portions 18A and 18B may be downloaded from another electronic storage, as required.

In operation, a particular type of power source 14 is operationally connected to processor 12 to provide power to processor 12. Upon execution of programs in manners exemplary of embodiments of the present invention, particular program portions (e.g. program portion 18A or 18B) is or are selected from the available program portions in dependence on the nature of the power source 14. For example, the selection may be made based on a classification of the particular power source 14 in use and the power consumption characteristics respectively associated with the available program portions 18.

For example, when type A battery 14A is used, program portion 18A may be selected for execution. If, on the other hand, type B battery 14B is used, program portion 18B may be selected. Once a program portion is selected, it is executed on processor 12 to perform the particular computing function. Entire programs may be formed and executed from multiple program portions for which selection between program portions may be available. Of course, not all program portions need to be suitably chosen based on power consumption characteristics. In particular, choice of program portions based on instantaneous power consumption profile or current drain pattern will have the greater impact for program portions using greater amounts of processing capacity.

To further illustrate how to select a program portion for execution based on battery characteristics, a more specific example is given below with the following assumptions:

There are two batteries available for powering device 10, Battery I and Battery II.

Each battery has an output voltage V, which is at a maximum, $V_{max}$, when the battery is fully charged. V will decrease overtime as current is drawn from the battery. The rate of discharge of the battery, or the instantaneous output current is I, which may vary from zero to a maximum value, $I_{max}$. Device 10 operates at a voltage $V_c$, which is smaller than $V_{max}$. When V becomes smaller than $V_c$, device 10 would shut-off. Thus, $V_c$ is the cut-off voltage for the batteries. The time for V to decrease from $V_{max}$ to $V_c$ is considered the lifetime of the battery, $T_{life}$.

For Battery I, $I_{max}=1$ A; if I=1 A, $T_{life}=2$ hours. If the current draw from Battery I exceeds 1 A, Battery I dies instantaneously and stops working. Battery I is lighter and cheaper;

For Battery II, $I_{max}=2$ A. If I=2 A, $T_{life}=1$ hour. If I=1 A, $T_{life}=1.5$ hour. However, if I alternates between 0.5 A and 1.5 A every 1 second, $T_{life}=2.5$ hours. Battery II is heavier and more expensive.

Two program portions are provided for keep device 10 in a standby condition for as long as possible. To achieve this goal, the minimum computing power required to execute each of the program portion causes processor 12 to exhibit an average current draw of 1 A, but the minimum instantaneous current draw is 0.5 A.

Program Portion I is coded to cause processor 12 to draw a constant current at the level of 1 A.

Program Portion II is coded to cause processor 12 to draw a pulsed current alternating between 0.5 A and 1.5 A every second.

The different current draw patterns of the program portions may be achieved by implementing different computing instructions to control processor activities over time. For example, assume the computing function to be performed includes calculating the value of "6 times 10" once in every two-second period, the execution of the instruction "6 times 10" by processor 12 could be completed in 1 second with a current draw of 1.5 A, and the execution of the instruction "plus 6" could be completed in 0.2 seconds with a current draw of 1 A. To cause the processor to exhibit different power consumption behaviour, Program Portion II may be coded to execute the instruction "6 times 10" once every two seconds, and Program Portion I may be coded to execute the instruction "plus 6" 10 times in every two second period. Thus, during execution, the same calculation task will take Program Portion I two seconds with a current draw of 1 A but take Program Portion II one second with a current draw of 1.5 A. Thus, when Program Portion I is executed, the processor would exhibit a constant power draw pattern, where the current draw is constat at 1 A. In contrast, when Program Portion II is executed, the processor would exhibit a pulsed current draw pattern, where the current draw alternates every second between 1.5 A, while the instructions is executed, and 0.5 A, while only the minimum current draw is required. As the average current draw for Program Portion II is also 1 A, the two program portions would cause the processor to consume the same amount of power over a two-second period but the instantaneous power consumption profile is different.

As can be understood, the above examples and assumptions are not realistic but are presented in this simplistic form to illustrate the possible manners in which the different program portions may be coded.

More generally, the power provision characteristics of a source of stored electrical energy (i.e. battery, or similar power source) in a device may be determined empirically. For example, with knowledge of minimum and maximum current draw of the device for given processor instructions, and minimum and maximum required power source voltage for the device, suitable consumption profiles for a battery may be developed in order to maximize battery life, while providing current between the minimum and maximum at battery voltages acceptable to the device. For any particular battery type used with device, a suitable matching program portion may be coded to have power consumption profiles that take advantage of the battery characteristics, in order to increase or maximize battery life. Suitably coded program portions matching the battery may be stored on the device for later use, in the presence of that battery.

For example, the power provision profile of a battery, and power consumption profile of a program portion, as used in an electronic device may be characterized in any number of ways. For example, the following current and timing characteristics for a battery and program portion/device may be assessed, and possibly matched:

Battery current characteristics:

Iconstant(threshold)—the current level at which consumption should be switched to draw pulsed current. Below this current level current drain may be constant, and above it current should be drained in pulses (keeping in mind the maximum available current).

Ipulsed(max)—the maximum current that can be drained. Ipulsed(max) may be a function of battery charge level changes. As the battery is drained it might not be able to handle the pulses of current drain at the same drainage that it could when it was more charged Battery timing characteristics Trelax(min)—the minimum length of the relaxation phase pulsed current discharge to exhibit a benefit. If we cannot relax for at least this amount of time then constant current method should be maintained.

Operating currents of the program portion:

Iconstant(device)—the current(s) the device would drain a program portion having a constant current power consumption profile. [Can be measured.]

Ipulsed_background(device)—the background current that would be drained in between pulses if program portion exhibits a power consumption profile in which pulsed current in drawn. [Can be measured.]

Ipulsed(device)—the current that would consumed as a result of the program portion during a pulse. [Can be measured by executing the program portion.]

Ipulsed_increment(device)—the incremental current above and beyond Ipulsed_background(device) drawn by the program portion in the event the program portion exhibits a pulsed current consumption profile [Can be measured by executing the program portion]

Ipulsed_total(device)—the total maximum current drain that would occur during a pulse [Can be measured by executing the program portion].

As can be understood, under these assumptions, a user may choose to use Battery I or Battery II depending on the situation. The selection may be made based on factors such as financial considerations, convenience, performance, and the like. Once a battery is selected, a matching program portion to be used with the selected battery may be selected, in manners exemplary of embodiments of the present invention. If Battery I is used, Program Portion I may be selected as it would result in a longer battery lifetime, since Program Portion II would cause Battery I to stop working instantly; and if Battery II is to be used, Program Portion II may be selected as it would lead to longer battery lifetime, by one hour compared to Program Portion I. When the battery in use, e.g. Battery I, is replaced by the other battery, e.g. Battery II, the program portion may also be replaced.

For reader convenience, the assumed characteristics of the batteries are listed in Table I, the assumed current draw patterns are listed in Table II, and the expected lifetimes for each battery/program portion combinations are listed in Table III.

TABLE I

Assumed Battery Characteristics

|  | $I_{max}$ | Current Drain Pattern | $T_{life}$ (hours) |
|---|---|---|---|
| Battery I | 1 A | Constant, at 1 A | 2 |
| Battery II | 2 A | Constant, at 2 A | 1 |
|  |  | Constant, at 1 A | 1.5 |
|  |  | Pulsed, 0.5 A-1.5 A | 2.5 |

TABLE II

Assumed Current Draw Patterns

|  | Current Draw Pattern |
|---|---|
| Portion I | Constant, at 1 A |
| Portion II | Constant, at 2 A |
|  | Constant, at 1 A |
|  | Pulsed, 0.5 A-1.5 A |

TABLE III

Expected Lifetime (hours)

|  | Program Portion I | Program Portion II |
|---|---|---|
| Battery I | 2 | Not operable |
| Battery II | 1.5 | 2.5 |

In this example, it may be desirable to have prior knowledge of the power provision profile of each battery associated with a certain current draw pattern before selection of the program portions can be made. As can be appreciated, the useful lifetime of a battery for a given current draw pattern may be measured by discharging the battery with the corresponding current drain pattern, monitoring the change in output voltage over time, and calculating the time it takes for the output voltage to drop from $V_{max}$ to $V_c$. The test may be carried out using the Program Portions I and II or by using other testing programs coded to cause the processor to exhibit the desired current draw pattern. A standard bench testing program may also be used. It is also possible to detect certain battery characteristics during use.

More generally, in operation the characteristics of power source 14 may be obtained in any suitable manner. For example, a user may input power source information into device 10. Alternatively, the power source may include or be associated with identifying information provided by the manufacturer that may be read or be known by processor 12. In other embodiments, the characteristics of the power source may be determined dynamically during use. For instance, battery discharge behavior may be monitored over time. An exemplary technique for automatic determination of battery chemistry is described in U.S. Pat. No. 6,215,275 to Bean, issued Apr. 10, 2001, the contents of which are incorporated herein by reference.

Characteristics data for different types of power sources may conveniently be pre-stored in memory 16 or in other memory accessible by device 10 so that when the type of power source in use is known, the characteristics data for that particular type of power source may be retrieved. In some embodiments, a battery itself may have a memory storage such as a memory chip or an identification tag for storing information that can be read by a computer device such as the device powered by the battery.

In one embodiment, the information provided by the battery itself may include one or more of the battery type (e.g. whether electrochemical or solar powered), maximum drain current, drain current level at which diffusion balances depletion of active material, preferred drain pattern (pulsed or constant), time required for sufficient self-recharge at given low current drain levels, and the like. When constant drain pattern is available, an optimal current drain value may be included. When a pulsed drain pattern is indicated, at least one of a high and a low drain level, a minimum or optimal cycle interval, a specified length of current drain at the high or low drain level during each cycle, an allowable background constant current level, and a specified step-amount for current increase may also be indicated. The information provided may also include other information useful for selecting an appropriate power or current drain pattern, as can be understood by persons skilled in the art.

Current drain or discharge characteristics or parameters may be represented in any suitable manner. For example, a current drain parameter may include one or more of a numerical value or range, indicator, flag, signal, register bit or bits. Device 10 may have a dedicated or integrated hardware or software for obtaining the power source information.

Once the characteristics of the power source are determined, the selection of program portions 18 may be made. As can be appreciated, the selection from available program portions 18 may be made any time prior to, or during program execution. For example, the selection may be made during power-up of device 10, or may be made after a change of batteries. The selection may also be made by host program that initiates execution of a particular program portion 18. Selection from program portions 18 may be done for only certain pre-chosen portions, such as those that cause consumption of relatively large amounts of power, of a larger program. The selection may also be made when a certain condition is detected, such as when the output level of the power source 14 is below a given level. In this case, the newly selected program portion may have a lower peak power consumption level. The selection may be made in response to a request to perform the particular computing function. The selection may be made manually by the user, or automatically. The user may choose to bypass or override an automatic selection in some situations. Re-selection of the program portion may also be made whenever the power source 14 is changed.

The selection of the program portion 18 may be effected in any suitable manner. In one embodiment, a look-up table may be pre-created and searched for a match between a particular battery type with a particular program portion 18. In another embodiment, certain calculation may be performed to determine the suitable program portion. A mode or state flag or indicator may be set to allow the same set instructions to take different actions, as described before. The selection may be effected completely or partially automatically. User selection may be allowed. A user may override a machine selection. A user may also indicate certain preferences or set certain limitations on the selection process.

As can now be appreciated, when the appropriate program portion of available program portions 18 is selected for performing a requested computing function, power source 14 can be more efficiently or optimally utilized. For example, it may be possible to maintain long battery life while still obtaining high instantaneous power output when calculations are performed. In appropriate situations, a user may select a suitable program portion so that long battery lifetime can be achieved without sacrificing much performance.

As can be understood, while only two different program portions 18A and 18B are profiled in the above examples, more program portions performing the same function, but causing different instantaneous power consumption behavior, could be provided, for example, for different types of batteries, for additional types of power sources, or for different application environments, and the like.

Many or all power-intensive computations made by device 10 may be selected in a similar manner so that in each case the power source can be efficiently or better utilized.

The set of program portions available for selection may include one or both of a program portion that causes the processor to exhibit a constant current draw pattern and a program portion that causes the processor to exhibit a pulsed current draw pattern. The set of program portions may also include additional program portions that exhibit different current draw patterns. Such different program portions may be implemented by altering a program code or by providing different input parameters to the same code.

As can be understood, a processor's own properties or characteristics can also affect its power consumption characteristics, in addition to the program portions executed thereon at the time. Thus, the optimal program portion may need to be selected from a given set of program portions based on both the characteristics of the power source and characteristics of the processor, if different types of processors can be used in the device, or type of device.

As can also be understood, instead of designing program portions 18 for different specific types of power sources, the program portions may be designed so that they are suitable for a number of possible generic classes of power sources (e.g. batteries, fuel cells, battery type, etc.). During use, depending on the generic class of the particular power source used, a particular program portion is selected. Further, different selections may be made to achieve different objectives, depending on the user preference or the particular application. For example, in the case of a battery, the program portion may be selected to maximize the battery's lifetime or discharge time, to optimally utilize the battery's instantaneous discharge capacity, or to optimally utilize the battery's overall discharge capacity, to optimally utilize the battery's self-recharging capability.

In some applications, the characteristics of the power source (and processor if needed) may be dynamically obtained or detected. In some applications, the characteristics of the power source may be provided by a user through a computer input. In some applications, some kind of a data structure, such as an association table or database may be provided to associate different program portions with different types or classes of power sources, so that the selection can be made once the type or class of the particular power source is determined.

As can be appreciated, in some embodiments, the selection of the program portion for execution may be performed or supervised by an energy management component of the electronic device. The selection may be made taking into consideration of factors such as overall power consumption strategy, overall power consumption demand, the activated hardware components, the concurrently executing software components, and the like. For example, when more than one component are causing current drain from the battery, the total current drain caused by all the components may be considered for selecting the program portion to use. In one embodiment, the program portion may be selected to exhibit a different current drain pattern so that each component may operate.

For example, when the program portion is executed alone it may exhibit a constant drain. However, when it is executed concurrently with another program portion, both program portions may be selected to exhibit pulsed current drain pattern wherein the execution of the two program portions is synchronized such that the overall current drain is substantially constant.

In the above embodiments, program portions 18 are embodied in software stored in memory. However, program portions 18 may be otherwise embodied in hardware. For example, program portions 18 may be formed as part of an integrated circuit, such as a processor, or other large scale integrated circuit. Program portions 18 may, for example, be cores of custom formed processor. Program portions 18 suitable for forming device 10 could thus be formed in a program language suited to create large scale, or very large scale integrated circuits such as HDL, Verilog, GDS, or the like. These could be stored on computer readable medium, used to form a device.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method of operating an electronic device having a processor powered by a power source, comprising:
   providing a plurality of program portions individually executable by said processor for performing the same computing function, each one of said plurality of program portions coded to cause said processor to exhibit a different instantaneous power consumption profile while performing said computing function and wherein there is no noticeable difference to a user in the functionality, performance or output of each of the plurality of program portions;
   selecting, based on at least one characteristic of said power source, a particular one of said plurality of program portions from said plurality of program portions; and
   executing said particular one of said plurality of program portions on said processor to perform said computing function.

2. The method of claim 1, wherein said particular program portion is selected based on at least one characteristic of said processor and an indicator of charge recovery characteristic of said power source.

3. The method of claim 1, wherein said power source comprises a battery.

4. The method of claim 1, wherein said power source comprises a fuel cell.

5. The method of claim 3, wherein said particular program portion is selected to maximize said battery's useful discharge time.

6. The method of claim 3, wherein said particular program portion is selected to match said battery's instantaneous discharge capacity.

7. The method of claim 1, wherein said plurality of program portions comprises at least one of a first program portion that causes said processor to exhibit a constant current draw pattern, and a second program portion that causes said processor to exhibit a pulsed current draw pattern.

8. The method of claim 1, wherein said selecting is performed in response to a request to perform said computing function.

9. The method of claim 1, wherein said selecting is performed during power-up of said electronic device.

10. The method of claim 1, wherein each one of said plurality of program portions is associated with a respective type of power source, and wherein said selecting comprises determining that said power source is of a particular type and that said particular program portion is associated with said particular type.

11. The method of claim 10, wherein said plurality of program portions are each associated with a different type of power source selected from nickel-iron batteries, nickel-cadmium batteries, alkaline batteries, nickel-metal-hydride batteries, lead-acid batteries, lithium-ion batteries, zinc-carbon batteries, zinc-chloride batteries, silver-oxide batteries, lithium batteries, mercury batteries, zinc-air batteries, lithium-ion polymer batteries, sodium-sulphur fuel cells, and solar batteries.

12. The method of claim 10, wherein said plurality of program portions are each associated with a different type of batteries selected from disposable batteries and rechargeable batteries.

13. The method of claim 1, wherein said indicator of said charge recovery characteristic of said power source is provided by said power source.

14. A computing device comprising:
    a processor;
    a power source for powering said processor; and
    a computer readable memory storing processor executable code, said code when executed by said processor causing said processor to:
    provide a plurality of program portions individually executable by said processor for performing the same computing function, each one of said plurality of program portions coded to cause said processor to exhibit a different current draw pattern from said power source while performing said computing function;
    retrieve an indicator of a charge recovery characteristic of said power source, said charge recovery characteristic correlated with the ability of said power source to self-recover charge-generating capacity during intervals of reduced current drain;
    select, based on at least said indicator, a particular program portion from said plurality of program portions causing said processor to exhibit a particular current draw pattern from said power source to facilitate self-recovery of said power source; and
    execute said particular program portion to perform said computing function.

15. The computing device of claim 14, wherein said particular program portion is selected based on at least one characteristic of said processor and said indicator of said charge recovery characteristic of said power source.

16. The computing device of claim 14, wherein said power source comprises a battery.

17. The computing device of claim 14, wherein each one of said plurality of program portions is associated with a respective type of power sources, and selection of said particular program portion comprises determining that said power source is of a particular type and that said particular program portion is associated with said particular type.

18. The computing device of claim 14, wherein said power source comprises a component for providing said indicator of said charge recovery characteristic of said power source.

19. A computer readable medium storing computer readable code, said code, when executed by a processor powered by a power source, causes said processor to perform the method of claim 1.

20. A method of configuring an electronic device, comprising a processor and a source of stored electrical energy, said method comprising:

determining a charge recovery characteristic for said source when providing electrical power to said device, said charge recovery characteristic correlated with the ability of said source to self-recover charge-generating capacity during intervals of reduced current drain;

coding a program portion based on said charge recovery characteristic to cause said processor to exhibit a desired current draw pattern that provides intervals of reduced current draw from said source, said intervals chosen to facilitate the self-recovery of said energy storage source, in order to increase the useful life of said energy storage source, using said program portion;

storing said program portion on said device for later execution.

21. Computer readable storage medium storing program portions used to form an electronic device having an energy storage source, said program portions comprising code coded based on a charge recovery characteristic of said energy source, said charge recovery characteristic correlated with the ability of said energy source to self recover charge-generating capacity during intervals of reduced current draw, and formed to provide intervals of reduced current draw from said energy storage source, said intervals chosen to facilitate the self-recovery of said energy storage source, in order to increase the useful life of said energy storage source when said device executes said program portions.

22. The computer readable storage medium of claim 21, wherein said program portions are executable by a processor.

23. The computer readable storage medium of claim 21, wherein said program portions may be converted to form a portion of an integrated circuit.

24. A method of operating an electronic device having a processor powered by a power source, comprising:

providing a plurality of program portions individually executable by said processor for performing the same computing function, each one of said plurality of program portions coded to cause said processor to exhibit a different current draw pattern from said power source while performing said computing function;

retrieving an indicator of a charge recovery characteristic of said power source, said charge recovery characteristic correlated with the ability of said power source to self-recover charge-generating capacity during intervals of reduced current drain;

selecting, based on at least said indicator, a particular one of said plurality of program portions from said plurality of program portions causing said processor to exhibit a particular current draw pattern from said power source to facilitate self-recovery of said power source; and     executing said particular one of said plurality of program portions on said processor to perform said computing function.

25. The method of claim 24, wherein each particular program portion of said plurality of program portions is formed to cause said processor to exhibit a desired current draw pattern from said power source that provides intervals of reduced current draw on said power source, said intervals chosen to facilitate the self-recovery of a power source that exhibits a particular charge recovery characteristic.

26. The method of claim 25, wherein the number, frequency, duration, and current level of each of said intervals of reduced current draw are chosen to cause said processor to exhibit a specific current draw pattern.

\* \* \* \* \*